Dec. 4, 1962 A. STEBLER ETAL 3,067,350
CONTROLLABLE IONIZATION CHAMBER
Filed June 10, 1958

INVENTORS
ALFRED STEBLER
KLAUS UNSER
BY
Morgan, Finnegan, Durham & Pine
ATTORNEYS United States Patent Office 3,067,350
Patented Dec. 4, 1962

3,067,350
CONTROLLABLE IONIZATION CHAMBER
Alfred Stebler and Klaus Unser, Zug, Switzerland, assignors to Landis & Gyr A.G., Zug, Switzerland, a body corporate of Switzerland
Filed June 10, 1958, Ser. No. 741,065
Claims priority, application Switzerland June 14, 1957
11 Claims. (Cl. 313—93)

This invention relates to ionization chambers and more particularly to ionization chambers having control means which function to control the reference level of ionization current.

Ionization chambers find use in the detection and measurement of radiation and are being utilized in increasing scope in this capacity in the field of industrial control. In the measurement and control of thickness, laminar weight and density, for example, ionization chambers are employed in a system which monitors these variables in terms of beta radiation intensity parameters.

In one well known system, thickness, density and related quantities are monitored and controlled by propagating radiation, for example beta radiation, through the material to be monitored and detecting the resultant radiation by means of an ionization chamber. The ionization current flowing in the chamber serves as the parameter of the monitored quantity. This technique is utilized, for example, in the control of sheet thickness in material processing.

For such measurements it is particularly desirable that an accuracy of plus or minus 1% be obtained. This tolerance should be stable and maintained within the prescribed limits over substantially long periods of time. In order to achieve these results the measurement of the radiation which has passed through the subject material should be accomplished with an accuracy of at least plus or minus 1%. This latter specification is not easily met due to inherent limitations in the components of the monitoring system and also because of the sensitivity of the radiation monitoring system to external environmental factors such as temperature and pressure. The problem is aggravated by the fact that the working radiation levels are of such low levels as to be comparable in magnitude to statistical fluctuations. Effective and continuous monitoring is also burdened by natural disintegration of the radiation source which introduces the need for periodic recalibration.

The use of a comparison method of measurement in which dual systems are employed has brought about a fundamental improvement in the monitoring and control process. With this approach one of the systems, a reference system, is responsive to a standard quantity while the other responds to the monitored quantity. By combining the output ionization currents of the two systems and detecting the differential current, sources of error which are common to both systems are eliminated. The differential current thus obtained provides an indication of the magnitude of the monitored quantity relative to the standard or reference quantity.

To effect a change in the standard or reference it is necessary that some component of the reference monitoring system be altered. This alteration can be accomplished, for example, by means of interchangeable standard absorbers or by varying the magnitude of the incident radiation as by means of a screen or by varying the sensitivity of the ionization chamber. This latter adjustment can be effected by means of a screen or by altering the volume of the chamber. All of these methods for changing the value of the reference can be established by a suitable servo system and can be controlled remotely. However, the simplest and most refined variation in the reference quantity is accomplished by alteration of the ionization conditions of the ionization chamber. This variation can be accomplished by varying the electric field distribution within the chamber and thereby controlling the reference ionization current.

A controllable ionization chamber is known in which a control grid is interposed between the counter electrode and the collector electrode at a small distance from the latter. Applied to the control grid is a control potential which serves to regulate the amount of generated ions which reach the collector electrode through the grid. A disadvantage of such a controllable ionization chamber results from the unfavorable field distribution in certain sites of the control region. The electric field intensity in the region between the grid and collector electrode, when below the saturation limit, permits recombination to occur. While this effect can be reduced by keeping the distance between the grid and collector electrodes small, burdensome structural requirements are placed on the chamber construction.

The present invention provides a controllable ionization chamber in which the above described disadvantages are avoided and is characterized in that a counter electrode and a control electrode, both homogeneous surfaces, are disposed in symmetrical relationship opposite to the collector electrode. Preferably these two electrodes are of substantially the same size and have the same position and spacing relation to the collector electrode.

It is thus one object of the invention to provide a controllable ionization chamber having rugged mechanical construction.

It is a further object of the invention to provide a controllable ionization chamber in which energy dissipation is negligible.

It is a further object of the invention to provide a controllable ionization chamber in which adjustment of the reference ionization current is achieved in a simple and efficient manner.

A further object of the invention is to provide a controllable ionization chamber in which the adverse effect of power supply fluctuations is minimized.

Other objects and advantages of the invention will be set forth in part hereinafter and in part will be obvious herefrom, or may be learned by practice with the invention, the same being realized and attained by means of the combinations, improvements and instrumentalities pointed out in the appended claims.

The invention consists of the novel parts, constructions, arrangements, combinations and improvements herein shown and described.

In order to understand the invention exemplary embodiments are illustrated in the accompanying drawings of which:

Figure 1:
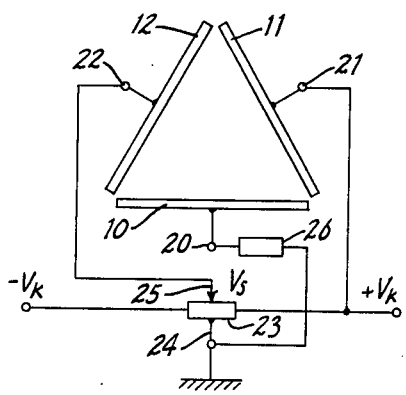
FIGURE 1 is a schematic representation of one controllable ionization chamber constructed in accordance with the principles of the invention.

Fundamentally, in the controllable ionization chamber of the invention two surface electrodes are located opposite a third electrode serving as collector electrode. They are preferably of substantially the same size and have substantially the same position relative to the collector electrode. In a practical example, the collector electrode also has the same area as the other two electrodes and all three electrodes are substantially quadratic in shape so that they form the sides of a three-sided regular prism without, however, any mutual physical contact. The electrodes have homogeneous, continuous surfaces. FIGURE 1 shows such an arrangement of electrodes as viewed in the direction of radiation. The housing forming the ionization chamber is not shown. A counter electrode 11 with terminal 21 and a control electrode 12 with terminal 22 are located opposite the collector electrode 10 having a terminal 20. All three electrodes subtend a 60° angle in pairs. The counter electrode 11 is energized by a potential $+V_k$ provided by a voltage source not shown. A potentiometer 23 with a fixed center tap 24 connected to a point of zero potential has its end terminals connected between the potentials $+V_k$ and $-V_k$. The control electrode 12 is connected to the movable tap 25 of the potentiometer so that the potential $V_s$ of the control electrode 12 can be varied from $+V_k$ to $-V_k$. When the chamber is irradiated, a controllable ionization current $I_i$ flows from the collector electrode 10 to the zero potential point through a load resistance 26.

Figure 2:
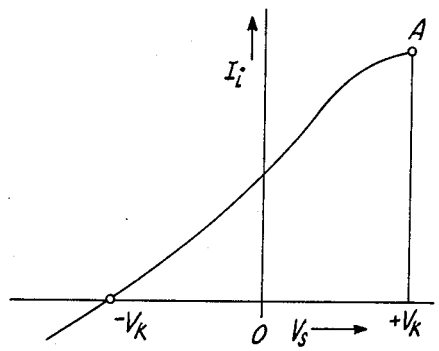
FIGURE 2 is a graphical plot of ionization current vs. control voltage.

The characteristic of the ionization current $I_i$ which is dependent on the control voltage $V_s$ is shown in FIGURE 2. If the counter electrode 11 and control electrode 12 have the same potential $+V_k$ and if this potential is sufficiently high, then saturation of the current $I_i$ occurs. This condition is indicated at point A. If, now, the control voltage $V_s$ is reduced, then the ionization current $I_i$ decreases and becomes zero at the potential $-V_k$. If the control voltage is made still more negative, the ionization current $I_i$ becomes negative.

The described effect is achieved in that the collector electrode 10 collects all positive charges under conditions illustrated at the point A in the graph. At a negative control voltage $V_s$, the collector electrode 10 collects positive charges in one portion of the chamber and negative charges in another portion. Part of the pairs of ions produced are also distributed directly between the control and counter electrodes. If, in view of the symmetrical construction, the same number of positive and negative charges strike the collector electrode, the ionization current $I_i$ becomes vanishingly small. The adjusted quiescent, or reference value of ionization current depends on the potentials of the three electrodes in the chamber. It is a prerequisite, however, that the field strength in the entire volume of the chamber stay above the saturation limit—this being guaranteed by a sufficiently high voltage $+V_k$. If the chamber voltage $V_k$ and control voltage $V_s$ are derived from the same source, as shown, then voltage variations from the source, within certain tolerances, have no influence on the reference ionization current.

Figure 3:
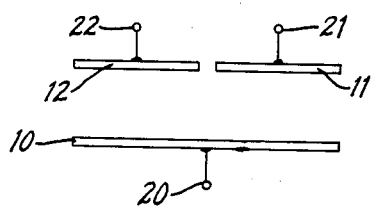
FIGURE 3 is a schematic representation of an alternate embodiment of the invention.

Controllability of the chamber does not require configurations limited to the electrode positions shown in FIGURE 1. Two equal-sized electrodes 11 and 12 could also lie side by side in a plane parallel to the collector electrode 10, as shown in FIGURE 3, but the field distribution is not optimum. It can be improved by dividing the electrodes 11 and 12 each into an equal number of segments, e.g. three, of equal size, and arranging these segments side by side alternatively. A further improvement can be brought about by making these segment electrodes form the segments of a circular cylinder which concentrically surrounds a circular cylindrical collector electrode. Such an arrangement is shown in FIGURE 4.

Figure 4:
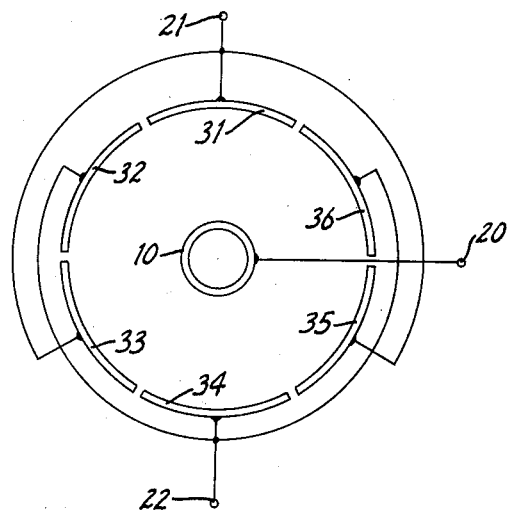
FIGURE 4 is a schematic representation of a third embodiment of the invention.
Figure 5:
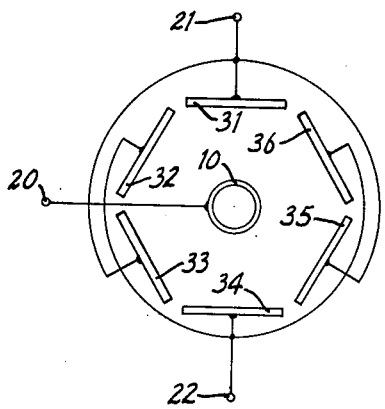
FIGURE 5 is a schematic drawing of a modification of the apparatus of FIGURE 4.

In FIGURE 4, equal sized cylinder segments 31 to 36 are coaxially arranged around a cylindrical collector electrode 10. The segments 31, 33, 35 are electrically connected to each other and to a terminal 21 and form the counter electrode, whilst the interconnected segments 32, 34, 36 are joined to the terminal 22 and constitute the control electrode. As shown in FIGURE 5, a structural simplification can be achieved in that flat plates 31 to 36 are arranged around a cylindrical collector electrode 10, the plates forming the faces of a regular prism coaxial with the collector electrode. The interconnected plates 31, 33, 35 again form the counter electrode and the interconnected plates 32, 34, 36 the control electrode.

The invention in its broader aspects is not limited to the specific combinations, improvements and instrumentalities described, but departures may be made therefrom within the scope of the accompanying claims without departing from the principles of the invention and without sacrificing its chief advantages.

What is claimed is:

1. A controllable ionization chamber comprising a dispersed medium responsive to beta radiation and the like for producing ionization current, means for detecting the magnitude of said radiation in terms of said ionization current comprising anode electrode means and collecting electrode means, and means for controlling the distribution of positive and negative charges intercepted by said electrode collecting means to thereby control the reference value of said ionization current, comprising control electrode means, said control means and anode electrode means being symmetrically disposed opposite to said collecting electrode means.

2. A controllable ionization chamber, according to claim 1, in which said anode and control electrode means have homogeneous surfaces.

3. A controllable ionization chamber, according to claim 1, in which the plane of said anode electrode means forms coplanar 60° angles with the planes of said control and collecting electrode means.

4. A controllable ionization chamber, according to claim 2, in which the plane of said anode electrode means forms coplanar 60° angles with the planes of said control and collecting electrode means.

5. A controllable ionization chamber, according to claim 1, in which said anode and control electrode means are of equal size, and lie substantially in a plane parallel to the plane of said collecting electrode means.

6. A controllable ionization chamber, according to claim 2, in which said anode and control electrode means are of equal size, and lie substantially in a plane parallel to the plane of said collecting electrode means.

7. A controllable ionization chamber, according to claim 1, in which each of said anode and control electrode means comprise a plurality of segments, the segments of said anode electrode means being spacially interspersed in alternating arrangement with the segments of said control electrode means.

8. A controllable ionization chamber, according to claim 2, in which each of said anode and control electrode means comprise a plurality of segments, the segments of said anode electrode means being spacially interspersed in alternating arrangement with the segments of said control electrode means.

9. A controllable ionization chamber, according to claim 7, in which the alternating arrangement of said anode electrode segments and said control electrode segments is disposed annularly and concentrically about said collecting electrode means.

10. A controllable ionization chamber, according to claim 9, in which the segments of said anode and control electrode means are arcuate.

11. A controllable ionization chamber, according to claim 9, in which the segments of said anode and control electrode means are of substantially flat shape.

References Cited in the file of this patent

UNITED STATES PATENTS

| | | |
|---|---|---|
| 1,961,708 | Penning et al. | June 5, 1934 |
| 1,995,018 | Spanner | Mar. 19, 1935 |
| 2,055,487 | Geffaken | Sept. 29, 1936 |
| 2,499,489 | Goldstein et al. | Mar. 7, 1950 |
| 2,623,191 | Reeves | Dec. 23, 1952 |
| 2,765,418 | Weisz | Oct. 2, 1956 |
| 2,776,390 | Anton | Jan. 1, 1957 |
| 2,874,304 | Lichenstein | Feb. 17, 1959 |
| 2,888,571 | Mazzagatti | May 26, 1959 |